United States Patent
VanDerWege et al.

(10) Patent No.: US 9,988,997 B2
(45) Date of Patent: Jun. 5, 2018

(54) METHOD AND SYSTEM FOR ENGINE TEMPERATURE CONTROL

(71) Applicant: Ford Global Technologies, LLC, Dearborn, MI (US)

(72) Inventors: Brad Alan VanDerWege, Plymouth, MI (US); Chris Paul Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 303 days.

(21) Appl. No.: 14/861,857

(22) Filed: Sep. 22, 2015

(65) Prior Publication Data
US 2016/0115884 A1    Apr. 28, 2016

Related U.S. Application Data (60) Provisional application No. 62/067,354, filed on Oct. 22, 2014.

(51) Int. Cl.
| F02D 41/00 | (2006.01) |
| F02D 41/14 | (2006.01) |
| F02P 9/00  | (2006.01) |
| F02D 41/02 | (2006.01) |

(52) U.S. Cl.
CPC ....... F02D 41/0087 (2013.01); F02D 41/024 (2013.01); F02D 41/1446 (2013.01); F02P 9/002 (2013.01); *F02D 2041/001* (2013.01); *Y02T 10/26* (2013.01)

(58) Field of Classification Search
CPC ............... F02D 41/0087; F02D 41/024; F02D 41/0245; F02D 41/1446; F02D 2041/001; F02P 9/002; Y02T 10/26
USPC ....... 123/325, 332, 692, 481, 676, 321, 324, 123/344, 345, 347, 348, 402, 404, 405, 123/500, 90.11, 596, 598, 605, 606, 609, 123/627, 637, 640, 645, 653, 655, 654; 60/601, 602, 603; 422/174
See application file for complete search history.

(56) References Cited

U.S. PATENT DOCUMENTS

| 5,483,941 | A  | 1/1996  | Cullen et al. |
| 6,978,204 | B2 | 12/2005 | Surnilla et al. |
| 7,762,237 | B2* | 7/2010 | Gibson ............ F01L 1/34 123/198 F |
| 8,272,362 | B2 | 9/2012 | Shane et al. |
| 8,651,091 | B2 | 2/2014 | Tripathi et al. |
| 8,931,273 | B2 | 1/2015 | Rollinger et al. |
| 9,638,121 | B2* | 5/2017 | Rayl ............ F02D 41/0087 |

(Continued)

OTHER PUBLICATIONS

Hilditch, James Alfred et al., "Systems and Methods for Exhaust Catalyst Temperature Control," U.S. Appl. No. 14/341,484, filed Jul. 25, 2014, 42 pages.

(Continued)

*Primary Examiner* — Lindsay Low
*Assistant Examiner* — John Bailey
(74) *Attorney, Agent, or Firm* — Julia Voutyras; McCoy Russell LLP (57) ABSTRACT

Methods and systems are provided to improve engine temperature control. Cylinders scheduled for deactivation may have their exhaust retained in the cylinder by holding an exhaust valve closed on the preceding firing cycle. In this way soot emissions on reactivation are reduced.

15 Claims, 4 Drawing Sheets

(56) References Cited

U.S. PATENT DOCUMENTS

| | | | |
|---|---|---|---|
| 2005/0131618 A1* | 6/2005 | Megli | F02D 13/0215 |
| | | | 701/101 |
| 2005/0279323 A1* | 12/2005 | Lewis | F01L 13/0005 |
| | | | 123/321 |
| 2006/0005802 A1* | 1/2006 | Lewis | F01L 1/38 |
| | | | 123/198 F |
| 2010/0263639 A1 | 10/2010 | Uhrich et al. | |
| 2011/0239987 A1* | 10/2011 | Maehara | F01L 1/181 |
| | | | 123/406.46 |
| 2012/0291423 A1* | 11/2012 | Nakagawa | F02D 13/08 |
| | | | 60/276 |
| 2014/0000552 A1* | 1/2014 | Glugla | F02D 43/00 |
| | | | 123/295 |
| 2014/0041624 A1* | 2/2014 | Rayl | F02D 41/0087 |
| | | | 123/348 |
| 2014/0053803 A1* | 2/2014 | Rayl | F02D 41/0087 |
| | | | 123/350 |
| 2014/0299097 A1* | 10/2014 | Furukawa | F02D 13/06 |
| | | | 123/344 |
| 2014/0352659 A1* | 12/2014 | Glugla | F02D 41/0082 |
| | | | 123/350 |
| 2015/0345407 A1* | 12/2015 | Glugla | F02D 17/02 |
| | | | 123/403 |

OTHER PUBLICATIONS

Glugla, Chris Paul et al., "IF Method and System for Engine Knock Control," U.S. Appl. No. 14/517,649, filed Oct. 17, 2014, 34 pages.

* cited by examiner

METHOD AND SYSTEM FOR ENGINE TEMPERATURE CONTROL

CROSS REFERENCE TO RELATED APPLICATIONS

The present application claims priority to U.S. Provisional Patent Application No. 62/067,354, entitled "METHOD AND SYSTEM FOR ENGINE TEMPERATURE CONTROL," filed Oct. 22, 2014, the entire contents of which are hereby incorporated by reference for all purposes.

FIELD

The present application relates to methods and systems for maintaining an engine temperature and/or an exhaust catalyst temperature to control particulate matter emissions from an engine system configured to perform skip-fire combustion.

BACKGROUND AND SUMMARY

After an engine cold-start, exhaust emissions and fuel consumption tend to be higher. This is because cold combustion surfaces lead to poor fuel evaporation, resulting in fuel films surviving on combustion surfaces even after the combustion event has occurred. The fuel-rich area above the film, and the fuel evaporating from the film after the flame has passed can lead to increased hydrocarbon and particulate matter (PM) emissions. In addition, cold engine oil leads to increased friction losses.

In recent years, spark ignited combustion engines have been configured to operate with a variable number of active or deactivated cylinders to increase fuel economy, while optionally maintaining the overall exhaust mixture air-fuel ratio about stoichiometry. Such engines can vary the effective displacement of the engine by skipping the delivery of fuel to certain cylinders in an indexed cylinder firing pattern, also referred to as a "skip-fire" pattern. For example, as shown by Tripathi et al. in U.S. Pat. No. 8,651,091, an engine fuel controller may continuously rotate which particular cylinders are fueled, which cylinders are skipped, and how many cylinders events the pattern is continued for. In addition, individual valve mechanisms of each cylinder may be selectively deactivated. By skipping fuel delivery to selected cylinders, the active cylinders can be operated near their optimum efficiency, increasing the overall operating efficiency of the engine.

The inventors herein have recognized that the individually controllable valves of the selectively deactivated cylinders may be leveraged to improve the rate of cylinder warming over a drive cycle. In particular, valve operation of a cylinder that will not be fired on the next cycle due to engine load may be controlled to retain hot exhaust gases in the cylinder, thereby heating the combustion chamber surfaces faster. In one example, some of the above issues may be addressed by a method that increases the rate of engine warming during cylinder deactivation comprising: selecting a cylinder for deactivation; and on a combustion cycle immediately preceding the deactivation, maintaining an exhaust valve of the selected cylinder closed during an exhaust stroke of the cylinder. In this way, the fast-responding individual cylinder valve mechanisms can be leveraged to increase combustion surface temperatures.

As an example, in response to a drop in engine load, an engine controller may select a cylinder pattern of individual cylinders of mechanisms for selective deactivation. Therein, the controller may select a number and identity of cylinders to be deactivated. A cylinder that is selected for deactivation and that will not be fired on the next engine cycle may have its exhaust valve held closed during an exhaust stroke of the firing cycle immediately preceding the deactivation. Specifically, instead of exhausting the burned gases, the hot gases are retained in the cylinder by not opening the exhaust valve. The exhaust gases are then retained in the cylinder while the cylinder is deactivated on the next cycle.

In this way, by keeping the hot exhaust gases in the cylinder for the next cycle, the combustion chamber surface is heated much faster. Consequently, the entire engine is heated faster as well. Further, keeping the burned gases in the deactivated cylinder longer improves continuing oxidation of the hydrocarbons remaining in the combustion chamber, leading to improved emissions for that cycle. Overall, engine performance is improved.

Still other valve operations may be used in various combinations to improve engine heating and allow for expedited catalyst warming. For example, a cylinder to be deactivated may be fired normally and exhausted normally on the engine cycle preceding the deactivation. Alternatively, the cylinder may be configured to induct, but not fuel, and exhaust fresh charge. In still another example, the cylinder may induct and fire but not exhaust. By deciding to induct and pass through air, the exhausted air can be combined with exhaust from other cylinders running slightly rich to provide fuel and air at the exhaust catalyst. The reaction of the fuel and air at the exhaust catalyst generates heat that results in a fast catalyst light-off. Other alternatives may include inducting air and fueling on induction or compression strokes but not sparking to provide a fuel air mixture to the catalyst. Further still, the air may be inducted into a cylinder, compressed, but not fueled until the exhaust stroke, that is, as a post injection. This latter approach may also include sparking near the exhaust stroke and burning into the exhaust phase, to provide heat flux to the exhaust catalyst. In this way, the various combinations of firing, not firing, firing during post injection, running rich in some cylinders while pumping air with other cylinders, etc., may be used in various combinations, all while putting known torque pulses into the engine system in such a manner as to provide acceptable NVH characteristics. Additionally, cylinders that have been combusted normally (active cylinders) may be operated at a higher load making them more stable and tolerant of additional spark retard. The additional spark retard maybe advantageously used during these conditions to add more heat flux to the engine and the exhaust catalyst.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
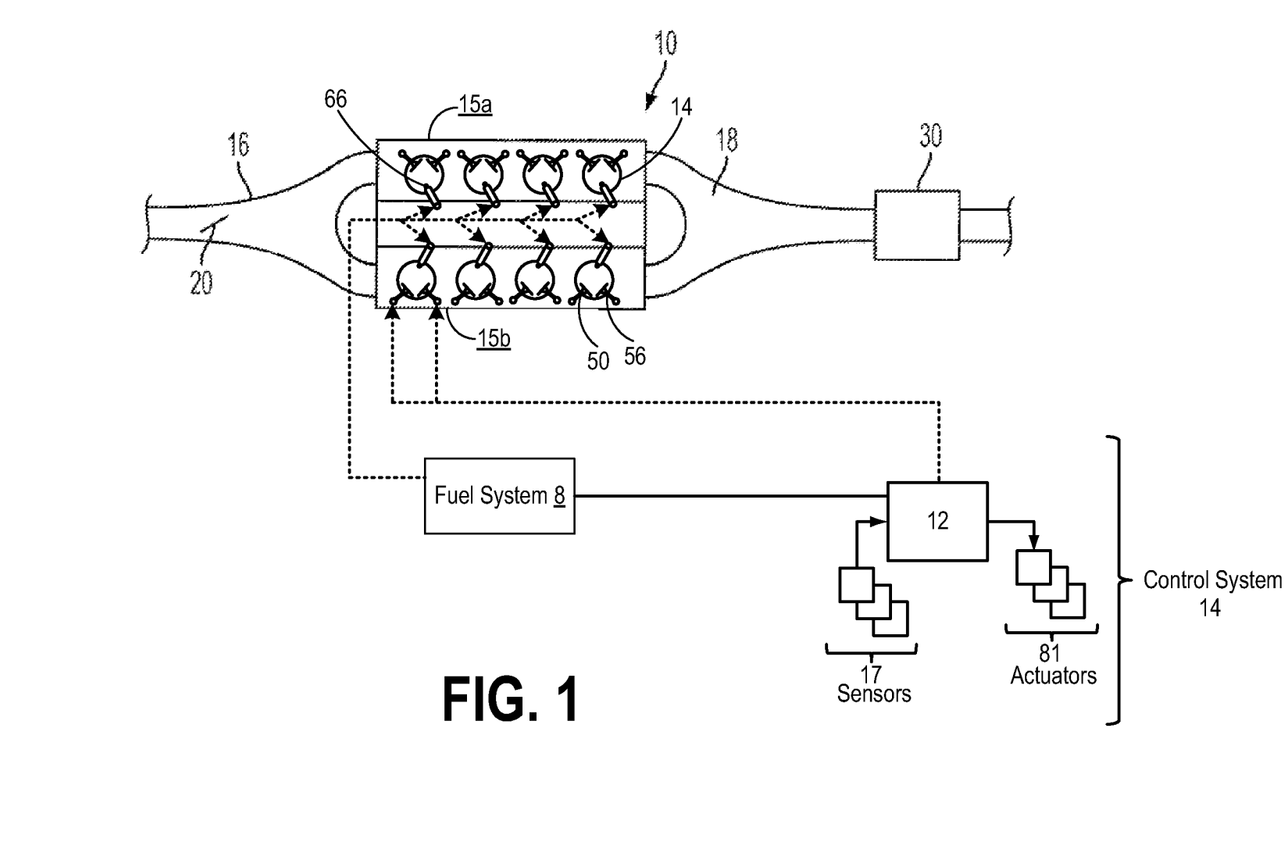
FIG. 1 shows an example embodiment of an engine system layout.
Figure 2:
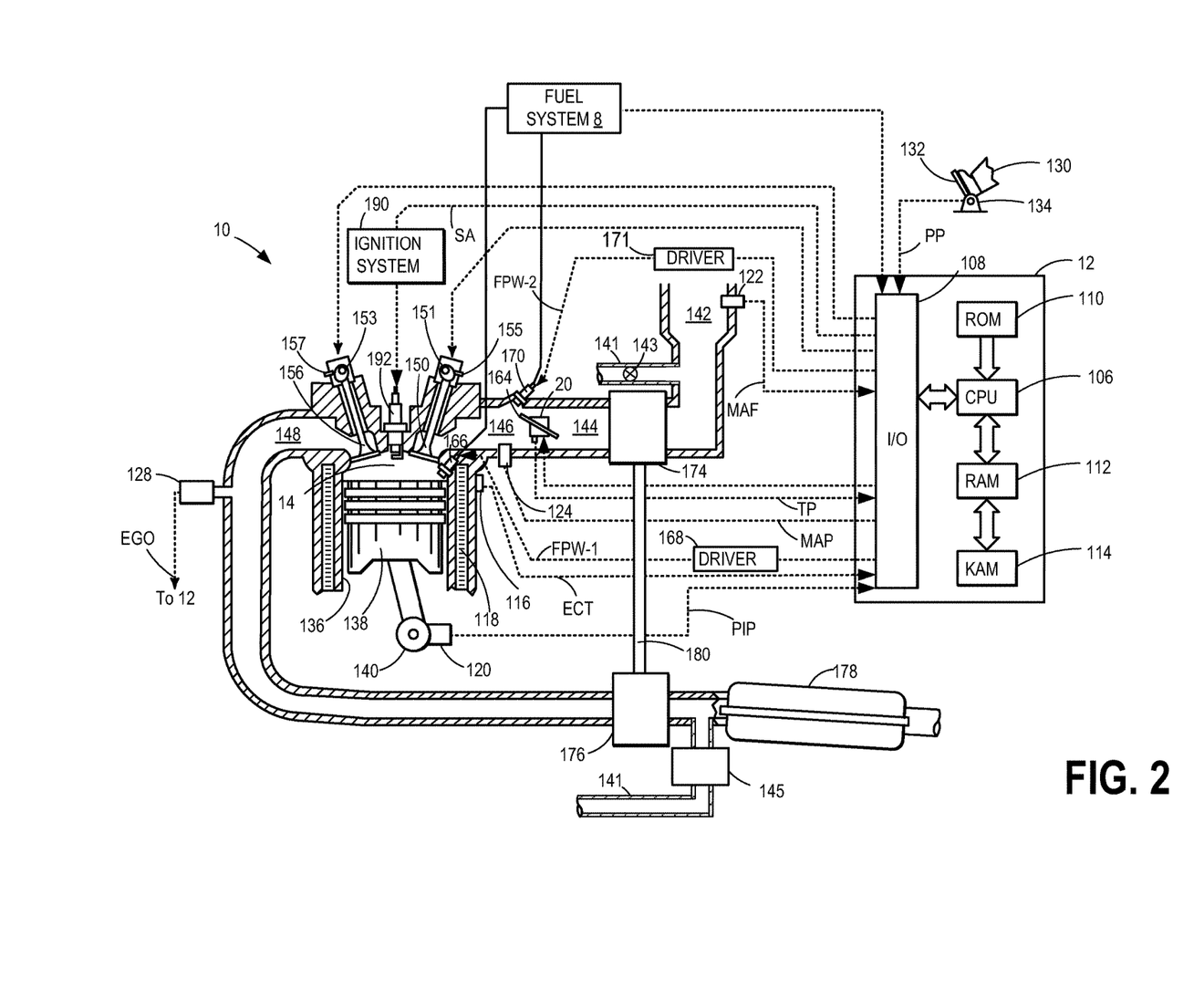
FIG. 2 shows a partial engine view.

Methods and systems are provided for adjusting a cylinder valve profile when operating an engine configured for selective cylinder deactivation (herein also referred to as skip-fire operation), such as the engine system of FIGS. 1-2. A controller may adjust the operation of an exhaust valve of a cylinder selected for selective deactivation. For example, the controller may perform a routine, such as the example routine of FIG. 3 to hold closed the exhaust valve of a cylinder to be deactivated on a subsequent engine cycle. By retaining hot exhaust gases in the cylinder during the deactivation, compression surface temperature can be raised, expediting engine heating. An example adjustment is shown with reference to FIG. 4. In this way, particulate matter emissions from cold cylinders may be reduced.

FIG. 1 shows an example engine 10 having a first bank 15a and a second bank 15b. In the depicted example, engine 10 is a V8 engine with the first and second banks each having four cylinders. Engine 10 has an intake manifold 16, with throttle 20, and an exhaust manifold 18 coupled to an emission control system 30. Emission control system 30 includes one or more catalysts and air-fuel ratio sensors, such as described with regard to FIG. 2. As one non-limiting example, engine 10 can be included as part of a propulsion system for a passenger vehicle.

Engine system 10 may have cylinders 14 with selectively deactivatable intake valves 50 and selectively deactivatable exhaust valves 56. In one example, intake valves 50 and exhaust valves 56 are configured for electric valve actuation (EVA) via electric individual cylinder valve actuators. While the depicted example shows each cylinder having a single intake valve and a single exhaust valve, in alternate examples, as elaborated at FIG. 2, each cylinder may have a plurality of selectively deactivatable intake valves and/or a plurality of selectively deactivatable exhaust valves.

During selected conditions, such as when the full torque capability of the engine is not needed, one or more cylinders of engine 10 may be selected for selective deactivation (herein also referred to as individual cylinder deactivation). This may include selectively deactivating one or more cylinders on only the first bank 15a, one or more cylinders on only the second bank 15b, or one or more cylinders on each of the first and second bank. The number and identity of cylinders deactivated on each bank may be symmetrical or asymmetrical.

During the deactivation, selected cylinders may be deactivated by closing the individual cylinder valve mechanisms, such as intake valve mechanisms, exhaust valve mechanisms, or a combination of both. Cylinder valves may be selectively deactivated via hydraulically actuated lifters (e.g., lifters coupled to valve pushrods), via a cam profile switching mechanism in which a cam lobe with no lift is used for deactivated valves, or via the electrically actuated cylinder valve mechanisms coupled to each cylinder. In addition, fuel flow and spark to the deactivated cylinders may be stopped, such as by deactivating cylinder fuel injectors.

In some examples, engine system 10 may have selectively deactivatable (direct) fuel injectors and the selected cylinders may be deactivated by shutting off the respective fuel injectors while maintaining operation of the intake and exhaust valves such that air may continue to be pumped through the cylinders.

While the selected cylinders are disabled, the remaining enabled or active cylinders continue to carry out combustion with fuel injectors and cylinder valve mechanisms active and operating. To meet the torque requirements, the engine produces the same amount of torque on the active cylinders. This requires higher manifold pressures, resulting in lowered pumping losses and increased engine efficiency. Also, the lower effective surface area (from only the enabled cylinders) exposed to combustion reduces engine heat losses, improving the thermal efficiency of the engine.

Cylinders may be deactivated to provide a specific firing (or skip-firing) pattern based on a designated control algorithm. More specifically, selected "skipped" working cycles are not fired while other "active" working cycles are fired. Optionally, a spark timing associated with a selected firing of a selected working chamber may also be adjusted based on a firing order or firing history of the selected working chamber. The engine controller 12 may be configured with suitable logic, as described below, for determining a cylinder deactivation (or skip-firing) pattern based on engine operating conditions.

Engine 10 may operate on a plurality of substances, which may be delivered via fuel system 8. Engine 10 may be controlled at least partially by a control system including controller 12. Controller 12 may receive various signals from sensors 17 coupled to engine 10 (and described with reference to FIG. 2), and send control signals to various actuators 81 coupled to the engine and/or vehicle (as described with reference to FIG. 2). The various sensors may include, for example, various temperature, pressure, and air-fuel ratio sensors.

Engine controller may include a drive pulse generator and a sequencer for determining a cylinder pattern based on the desired engine output at the current engine operating conditions. For example, the drive pulse generator may use adaptive predictive control to dynamically calculate a drive pulse signal that indicates which cylinders are to be fired and at what intervals to obtain the desired output (that is, the cylinder firing/skip-firing pattern). The cylinder firing pattern may be adjusted to provide the desired output without generating excessive or inappropriate vibration within the engine. As such, the cylinder pattern may be selected based on the configuration of the engine, such as based on whether the engine is a V-engine, an in-line engine, the number of engine cylinders present in the engine, etc. Based on the selected cylinder pattern, the individual cylinder valve mechanisms of the selected cylinders may be closed while fuel flow and spark to the cylinders are stopped.

Since optimal efficiency for a given cylinder is near full output, a lower frequency of firing events may be chosen to reduce output. For example, skipping every other cylinder would produce half of the power, on average. Spacing the firing events out as evenly as possible tends to minimize vibrations due to the varying torque output. Whether all of the cylinders are included in the skip-firing pattern may depend on the fraction of output desired, and other considerations including cylinder temperature.

In this way, by adjusting the cylinder pattern of individual cylinder valve mechanisms and individual cylinder fuel injectors, a desired engine output can be provided by operating fewer cylinders more efficiently, thereby improving fuel economy.

FIG. 2 depicts an example embodiment of a combustion chamber or cylinder of internal combustion engine 10.

Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber') 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 may receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 13:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes.

In some embodiments, each cylinder of engine 10 may be configured with one or more injectors for delivering fuel to the cylinder. As a non-limiting example, cylinder 14 is shown including two fuel injectors 166 and 170. Fuel injectors 166 and 170 may be configured to deliver fuel received from fuel system 8 via a high pressure fuel pump, and a fuel rail. Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12.

Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 166 and 170, different effects may be achieved.

Fuel may be delivered by both injectors to the cylinder during a single cycle of the cylinder. For example, each injector may deliver a portion of a total fuel injection that is combusted in cylinder 14. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 2 shows only one cylinder of a multi-cylinder engine. As such each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 2 with reference to cylinder 14.

The engine may further include one or more exhaust gas recirculation passages for recirculating a portion of exhaust gas from the engine exhaust to the engine intake. As such, by recirculating some exhaust gas, an engine dilution may be affected which may improve engine performance by reducing engine NOx, peak cylinder combustion temperatures and pressures, throttling losses, and NOx emissions. In the depicted embodiment, exhaust gas may be recirculated from exhaust passage 148 to intake passage 144 via EGR passage 141. The amount of EGR provided to intake passage 144 may be varied by controller 12 via EGR valve 143. Further, an EGR sensor 145 may be arranged within the EGR passage and may provide an indication of one or more pressure, temperature, and concentration of the exhaust gas.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed. The controller 12 receives signals from the various sensors of FIGS. 1-2 and employs the various actuators of FIGS. 1-2 to adjust engine operation based on the received signals and instructions stored on a memory of the controller In this way, the system of FIGS. 1-2 enables a method for an engine comprising: selecting a cylinder for deactivation; and on a combustion cycle immediately preceding the deactivation, maintaining an exhaust valve of the selected cylinder closed during an exhaust stroke of the cylinder. In one example, the selected cylinder is a first cylinder, the method further comprising selecting a second, different cylinder for deactivation, and on the combustion cycle immediately preceding the deactivation, opening an exhaust valve of the second cylinder closed during an exhaust stroke of the second cylinder. The deactivation may be performed responsive to a drop in engine load. The maintaining is performed after an exhaust temperature is higher than a threshold temperature.

In another example, a method for an engine comprises: deactivating a cylinder pattern of individual cylinder mechanisms, the cylinder pattern including a first deactivated cylinder and a second active cylinder, wherein in response to a command for deactivation of the first cylinder, an exhaust valve of the first cylinder is held closed on an exhaust stroke of a firing cycle immediately preceding the deactivation of the first cylinder.

Figure 3:
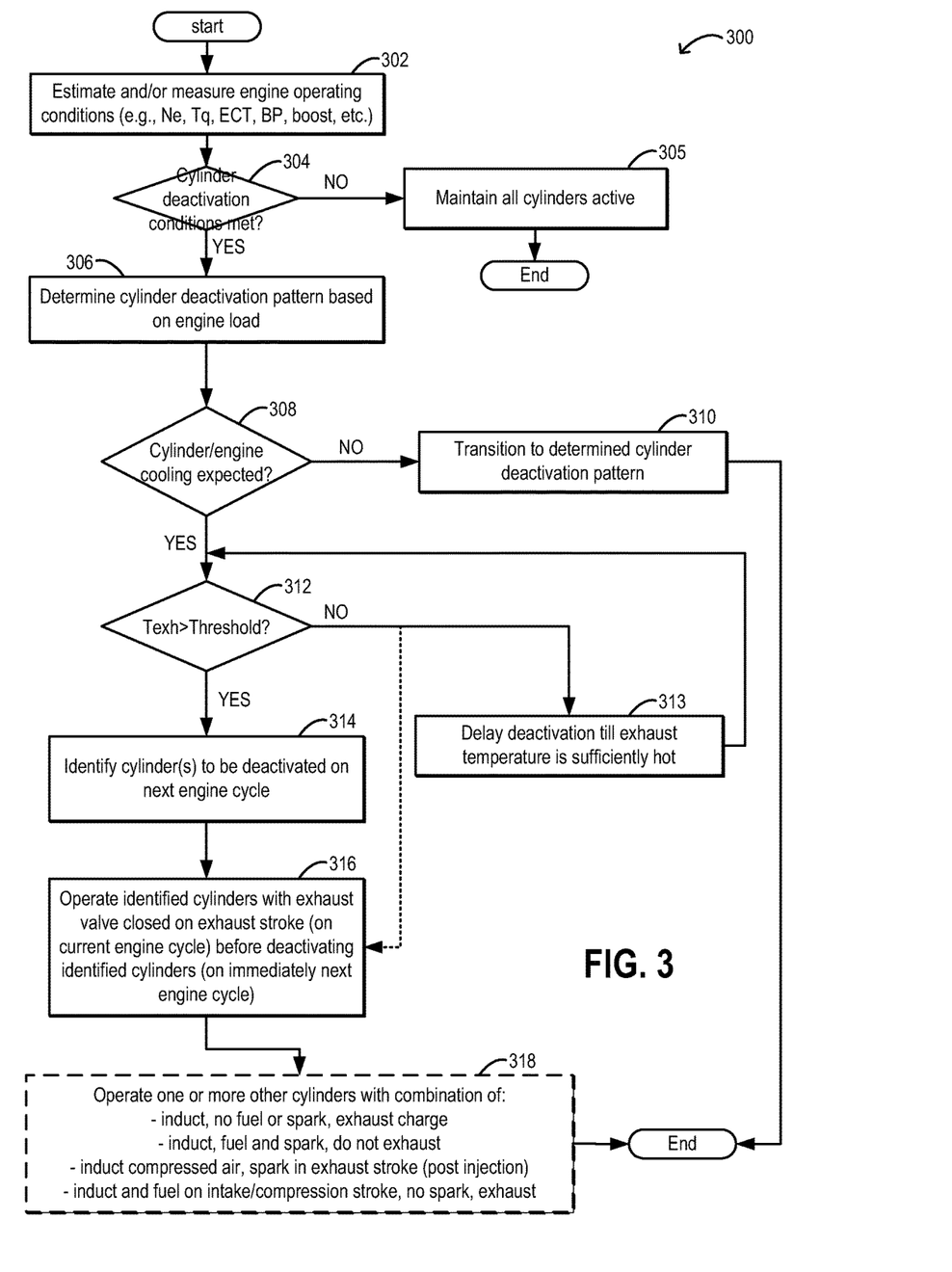
FIG. 3 shows a high level flow chart for adjusting cylinder valve operation during and prior to cylinder deactivation to expedite engine heating.

FIG. 3 shows an example of routine 300 for adjusting individual cylinder valve mechanisms during cylinder deactivation in response to engine temperature, exhaust temperature and/or the temperature of an exhaust catalyst. The method allows exhaust to be trapped in a deactivated cylinder, thereby maintaining the combustion surface of the cylinder hot during the deactivation. By reducing cooling of a deactivated cylinder, a frequency of cylinder reactivation is reduced, while also reducing PM emissions from a reactivated cylinder. Instructions for carrying out method 300 may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, such as the actuators described with reference to FIGS. 1-2, according to the methods described below.

At 302, the routine includes estimating and/or measuring engine operating conditions. The estimated conditions may include, for example, engine speed, driver torque demand, engine temperature, ambient conditions such as ambient temperature, humidity, and barometric pressure, boost level, etc. At 304, based on the estimated conditions, it may be determined if cylinder deactivation conditions have been met. In one example, cylinder deactivation conditions may be considered met if the engine load is lower than a threshold, or driver torque demand is lower than a threshold. If cylinder deactivation conditions are not met, then at 305, the routine includes maintaining all engine cylinders active.

If cylinder deactivation conditions are met, then at 306, the controller may select a cylinder pattern based on the engine load. The cylinder deactivation pattern may be further selected based on one or more of engine speed, vehicle speed, engine temperature, engine NVH, and a transmission gear selection (e.g., whether the engine is currently in a first transmission gear with a first, lower gear ratio or a second transmission gear with a second, higher gear ratio). Determining the cylinder pattern includes determining the number and identity of cylinders to be deactivated, and further determining a duration of the deactivation. For example, the controller may determine a number of combustion events or engine cycles over which to maintain the selected cylinders deactivated. The total number of deactivated/active cylinders may depend on the total actual number of engine cylinders and the driver demand torque. As a non-limiting example, two cylinders may be deactivated for a four cylinder engine, three cylinders may be deactivated for a six cylinder engine, and four cylinders may be deactivated for an eight cylinder engine. In some examples, the same set of cylinders may be selected for deactivation each time cylinder deactivation conditions are met, while in other examples, the identity of the deactivated cylinders may be varied each time cylinder deactivation conditions are met.

As an example, the controller may retrieve a pattern from a look-up table stored in the controller's memory. Cylinder patterns may be stored in the look-up table as a function of engine load for the given engine configuration. In one example, at lower engine loads, the cylinder pattern may include the firing of every second or third cylinder. As an example, in an in-line 4 cylinder engine with cylinders labeled 1 through 4 and with a cylinder firing pattern of 1-3-4-2, during regular operating conditions, when no cylinder is deactivated and all cylinders are active, the cylinders may be firing as 134213421342 and so on. In response to cylinder deactivation conditions being met, to provide fuel economy benefits, the controller may shift engine operation to a cylinder pattern where every third cylinder is fired resulting in the pattern 1xx2xx4xx3xx1xx, wherein x represents a skipped cylinder.

At 308, it may be determined if cylinder cooling or engine cooling is expected. In one example, some engine cooling may be expected when the engine operates at low to very light engine loads for an extended amount of time (e.g., at lower than a threshold load for longer than a threshold duration, or with cylinder deactivation for longer than a threshold duration). In another example, engine cooling may be expected if the vehicle is traveling on a road with a negative grade (that is, travelling downhill). In another example, engine cooling may be expected if the ambient temperature is low. As yet another example, engine cooling may occur if the engine temperature is relatively low and a tip-out event occurs. As such, engine cylinder cooling can result in degraded exhaust emissions when the cylinders are subsequently reactivated. In addition, fuel consumption may be higher when operating with cooler cylinders. If cylinder cooling is not expected, then at 310, the routine includes transitioning to operating the engine with the cylinder pattern determined at 306.

If cylinder cooling is expected, then at 312, it may be first determined if the exhaust temperature is sufficiently hot. In particular, it may be confirmed that the exhaust temperature is higher than a threshold to provide light-off of the exhaust catalyst. If the exhaust temperature is not sufficiently hot, at 313, the routine includes delaying cylinder deactivation until the exhaust temperature is sufficiently hot. This delay allows particulate matter emissions due to combustion surface cooling to be reduced.

However, it will be appreciated that in some examples, even when the exhaust temperature is lower than the threshold, the controller may proceed to 314 to deactivate one or more engine cylinders, while relying on additional cylinder valve adjustments, described herein at 318, to raise exhaust temperatures and expedite catalyst light-off. In doing so, cylinder deactivation benefits can be achieved over a longer duration of engine operation.

Returning to 312, if the exhaust temperature is sufficiently hot, then at 314, the routine includes identifying one or more cylinders to be deactivated on the next engine cycle (e.g., based on the cylinder pattern selected at 306). That is, a first cylinder that is firing on the current cycle but will not be fired on the next cycle based on the engine load may be identified. The first cylinder may be different from a second cylinder that is firing on each of the current cycle and the next cycle (active engine cylinder). At 316, the identified cylinder(s) is operated on the current cycle with the exhaust valve maintained closed on the exhaust stroke. That is, instead of exhausting the burnt gases and letting the cylinder motor for the next cycle with little charge or fresh air, the burned gases are kept in the cylinder by not opening the exhaust valves after combustion in the cylinder and until the cylinder is reactivated. By retaining the hot exhaust gases in the cylinder for the next cycle (when the cylinder is deactivated), the combustion chamber surface of the given cylinder may retain heat longer. By similarly performing exhaust valve deactivation on one or more other cylinders that are scheduled to be deactivated, cylinder heating is enabled even while the cylinder is deactivated. As such, this allows the engine to be gradually heated. By keeping the burned gases in the cylinder for a longer duration, continuing oxidation of hydrocarbons retained in the chamber and the exhaust is also improved, leading to improved emissions for that cycle.

In one example, determining the selected cylinder pattern includes determining that the selected cylinder(s) is to be deactivated for a number of engine cycles. Therein, the maintaining of the exhaust valve of the selected cylinder closed is responsive to the number of engine cycles being higher than a threshold number. For example, when the number of engine cycles is higher than the threshold number, the deactivation can result in significant cylinder cooling, which can require more fuel during the subsequent reactivation. The threshold number may be based on one or more of an engine coolant temperature, an ambient temperature, and a cylinder temperature, the threshold number decreased as any of the engine coolant temperature, ambient temperature, and cylinder temperature decreases. Herein, by holding the exhaust valve closed, more heat is retained in the cylinder to be deactivated, and for longer, reducing the cylinder cooling impact of the deactivation.

It will be appreciated that when the given cylinders are subsequently reactivated, the exhaust valve of the reactivated cylinder may be opened before the intake valve(s) is opened to allow any residual gases remaining trapped in the cylinder to be pushed out before inducting a fresh charge into the cylinder. This allows misfire occurrences during the reactivation to be reduced. For example, the exhaust valve of the reactivated cylinder may be opened during an exhaust stroke of an engine cycle immediately preceding the reactivation. In one example, the exhaust valve may be opened near the beginning of the exhaust stroke. As such, the exhaust valve may be opened later in the exhaust stroke, such as if needed for later decision-making, however, the exhaust gas may have been compressed during the exhaust stroke leading to a loss in work when the exhaust valve is subsequently opened.

Optionally, at 318, along with the deactivation of the exhaust valve of a cylinder selected for deactivation on the next cycle, valve operation of one or more other cylinders to be deactivated or remaining active may be adjusted. As a result various skip-firing combinations may be generated. For example, while a first cylinder is fired and exhausted normally, a second cylinder may be configured to induct air, but not fuel, and exhaust the fresh charge. In yet another example, the air from such a cylinder may be combined with exhaust from other cylinders operating slightly richer than stoichiometry to provide fuel and air to the catalyst to react and create heat resulting in fast catalyst light-off. Other alternatives may include inducting air and fueling on an intake or compression stroke, but not providing spark so as to generate an air-fuel mixture at a desired ratio at the exhaust catalyst. Further still, the inducted air may be compressed, but not fueled until an exhaust stroke to provide a post injection. This may be coupled with spark timing near the exhaust event to provide combustion into the exhaust phase. This provides additional heat flux to the exhaust catalyst.

A selection between the different options may be based on NVH considerations as well the excitation pulses. For example, a rich combustion event may add torque and/or a torque impulse into the system. However, a post injection on the exhaust stroke may provide heat only without a torque impulse into the system, thereby resulting in different NVH characteristics.

By using the various combinations discussed at 318, all while putting known torque pulses into the engine system, engine and exhaust catalyst temperature may be better controlled while providing acceptable NVH characteristics. Further still, the active cylinders may be operated with additional spark retard to add more heat flux to the exhaust catalyst. Since the active cylinders are operated at higher average cylinder load during selective cylinder deactivation, they may be more tolerant of the additional spark retard.

As one example, a first cylinder may be selected for deactivation in the cylinder pattern. This first cylinder may have intake and/or exhaust valve operation disabled for a determined number of engine cycles. In addition, a second, different cylinder my be selected for deactivation, the second cylinder operated for at least some of the determined number of engine cycles with one or more of a deactivated intake valve, a deactivated exhaust valve, a deactivated fuel injector, and delayed spark.

As a non-limiting example, an engine controller may operate the second cylinder in a first mode with the intake valve opening during an intake stroke, the fuel injector deactivated, deactivated spark, and with the exhaust valve opening for an exhaust stroke. Alternatively, the engine controller may operate the second cylinder in a second mode with the intake valve opening during the intake stroke, the fuel injector activated, deactivated spark, and with the exhaust valve opening during the exhaust stroke. Alternatively, the engine controller may operate the second cylinder in a third mode with the intake valve opening during an intake stroke or a compression stroke, the fuel injector activated and fuel delivered during the compression stroke, spark deactivated, and with the exhaust valve opening during the exhaust stroke. Alternatively, the engine controller may operate the second cylinder in a fourth mode with the intake valve opening during the intake stroke, the fuel injector activated, spark delayed to the exhaust stroke, and with the exhaust valve opening during the exhaust stroke. As such, the various combinations of valve, fuel, and spark adjustment enable different amounts of heat to be transferred to engine components. It will be appreciated that still other modes than those listed above may be possible to provide a combination of valve, fuel, and spark adjustments that deliver a desired amount of heat to the engine (e.g., the cylinder, the exhaust catalyst, etc.). The controller may further select a mode of operation for the second cylinder based on engine temperature.

As such, the controller may aim to either heat the catalyst or heat the engine/engine cylinders. In one example, the controller may select a mode other than the first mode (such as one of the second, third, or fourth modes) in response to the second cylinder needing more heating than the first cylinder (such as when no combustion has occurred in the second cylinder for a duration, or when the cooling system is imbalanced) or in response to the second cylinder being connected to a different catalyst than the first cylinder (such as in a V-engine configuration) where the catalyst coupled to the second cylinder needs additional heating to be sufficiently activated.

As still another example, while operating the engine cylinders with the selected cylinder pattern of deactivated/active cylinders, the controller may operate at least one of the remaining cylinders with spark active and fuel enrichment (e.g., via a rich fuel injection relative to stoichiometry delivered during a compression stroke) while operating at least another of the remaining cylinders with spark active and fuel enleanment (e.g., via a lean fuel injection relative to stoichiometry delivered during an intake stroke) to raise the engine temperature above the threshold. Herein, the rich cylinder would provide some CO and hydrocarbons at the catalyst which would react with the oxygen provided to the catalyst by the lean cylinder. In this way, a rich air-fuel ratio charge from the enriched cylinder may mix with the lean air-fuel ratio charge from the enleaned cylinder at the engine exhaust, such as at the exhaust catalyst, generating an exothermic reaction at the catalyst. As such, this expedites exhaust catalyst heating.

In still another example, while operating the engine cylinders with the selected cylinder pattern of deactivated/active cylinders, the controller may operate at least one of the remaining cylinders with spark deactivated, and the cylinder fueled stoichiometrically to expedite catalyst heating.

Figure 4:
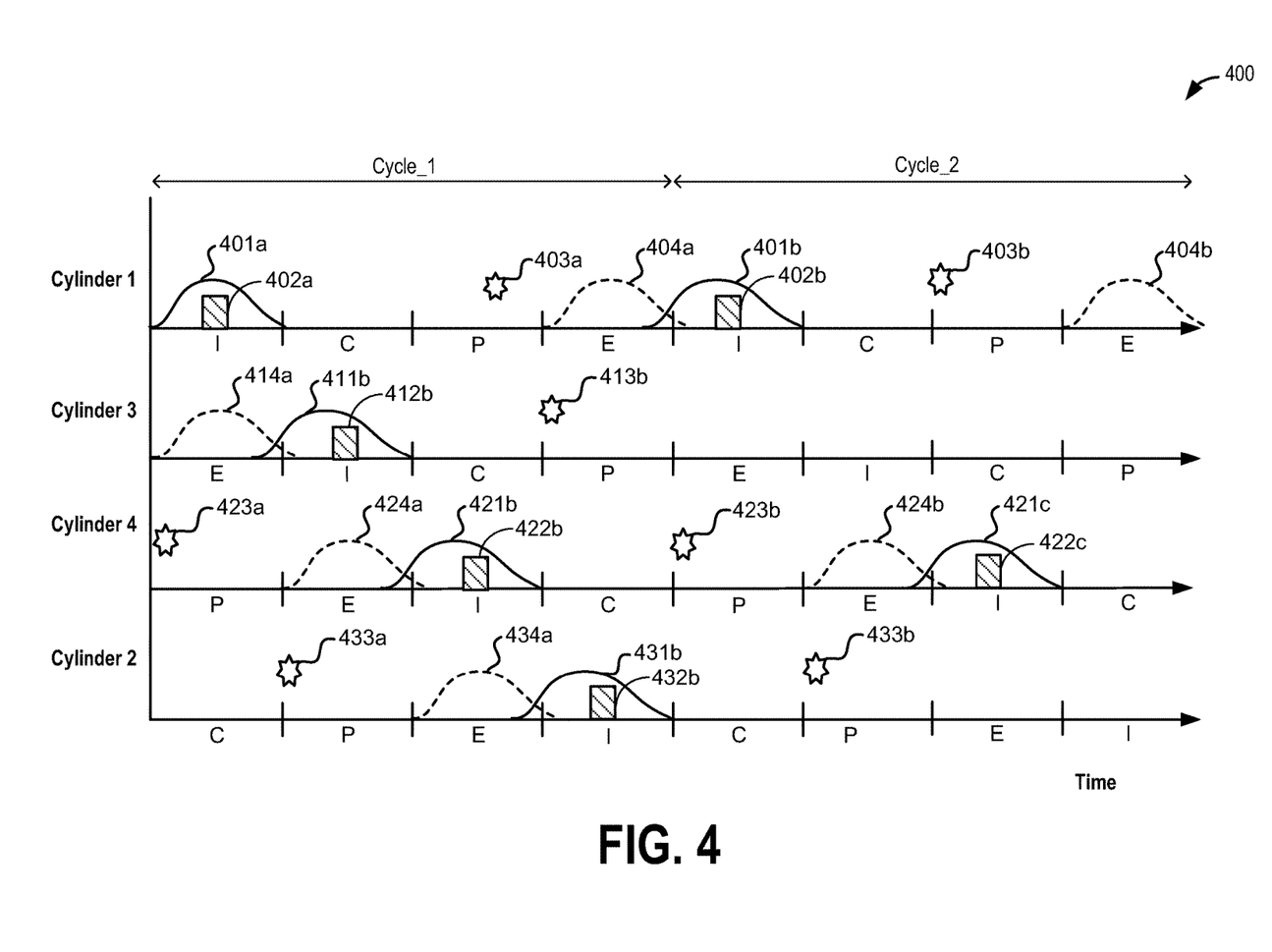
FIG. 4 shows an example cylinder valve adjustment during a transition in to a skip-fire mode of operation to reduce PM emissions.

Turning now to FIG. 4, map 400 shows an example exhaust valve adjustment for a four cylinder in-line engine having cylinders 1-4 arranged consecutively along an engine block (not shown). The cylinders 1-4 are configured to fire in the order 1-3-4-2. Map 400 depicts intake valve timings (solid line) and exhaust valve timings (dashed line) with respect to engine piston position being in an intake stroke (I), exhaust stroke (E), power stroke (P) or compression stroke (C). Map 400 further depicts cylinder spark ignition events by stars 403a-b, 413b, 423a-b, 433a-b, and cylinder fuel injection events by rectangles 402a-b, 412b, 422a-b, 432b.

In the depicted example, on the first cycle (Cycle_1), the engine fires in the firing order 1-3-4-2, with each cylinder of the engine firing once. Then, on the next cycle (cycle_2), a skip-fire mode is entered and the engine fires according to the cylinder pattern 1-x-4-x, wherein x represents the skipped cylinder. Herein, every alternate cylinder is fired while the other alternate cylinder is skipped, resulting in a ½ firing pattern. In this case, the firing of cylinder 3 is skipped after the firing of cylinder 1, and then the firing of cylinder 2 is skipped after the firing of cylinder 4.

The first plot from the top of the figure represents position of cylinder number one (cylinder 1). And, in particular, the stroke of cylinder number one as the engine crankshaft is rotated. Cylinder 1 strokes are labeled according to the engine position. For example, cylinder 1 is shown first in an intake stroke (I), the engine rotates and cylinder number one enters the compression stroke (C) followed by power (P) and exhaust (E) strokes. The cylinder cycle for cylinder 1 then repeats. For a four stroke engine a cylinder cycle may be 720°, the same crankshaft interval for a complete cycle of the engine.

The second plot from the top of the figure, likewise represents position of cylinder number three (cylinder 3), in particular, the stroke of cylinder number three as the engine crankshaft is rotated. Cylinder 3 strokes are labeled according to the engine position. For example, Cylinder 3 is shown first in an exhaust stroke (E), the engine rotates and cylinder number three enters the intake stroke (I), followed by compression (C) and power (P) strokes. The cylinder is then deactivated for the next combustion cycle (that would have started on the subsequent intake stroke). The third plot from the top of the figure, likewise represents position of cylinder number four (cylinder 4), in particular, the stroke of cylinder number four as the engine crankshaft is rotated. Cylinder 4 strokes are labeled according to the engine position. For example, Cylinder 4 is shown first in power stroke (P), the engine rotates and cylinder number four enters the exhaust stroke (E), followed by intake (I) and compression (C) strokes. The cylinder cycle for Cylinder 4 then repeats. The fourth plot from the top of the figure, likewise represents position of cylinder number two (Cylinder 2), in particular, the stroke of cylinder number two as the engine crankshaft is rotated. Cylinder 2 strokes are labeled according to the engine position. For example, Cylinder 2 is shown first in a compression stroke (C), the engine rotates and cylinder number two enters the power stroke (P), followed by exhaust (E) and intake (I) strokes. The cylinder is then deactivated for the next combustion cycle (Cycle_2).

With reference to the first cylinder, a first cylinder event is shown at 401a-404a, and a subsequent cylinder event in Cylinder 1 is shown at 401b-404b. During each of the first and second cylinder event, the intake valve is opened during the intake stroke (401a, 401b) to provide air to the cylinder. Fuel is then injected to the engine cylinders by port or direct injectors (402a, 402b). The fuel and air mixture are compressed and ignited (403a, 403b) during the compression stroke. Peak cylinder pressure may occur at top-dead-center of compression stroke or during the expansion stoke. Exhaust gases are then released by opening the exhaust valve during the exhaust stroke (404a, 404b). Herein, since Cylinder 1 is to be kept active following the first cylinder event, the exhaust valve operation at 404a continues as expected.

With reference to the fourth cylinder, the completion of a first cylinder event is shown at 423a-424a, and a subsequent cylinder event in Cylinder 4 is shown at 421b-424b. During each of the first and second cylinder event, the intake valve is opened during the intake stroke (421b shown) to provide air to the cylinder. Fuel is then injected to the engine cylinders by port or direct injectors (422b shown). The fuel and air mixture are compressed and ignited (423a, 423b) during the compression stroke. Peak cylinder pressure may occur at top-dead-center of compression stroke or during the expansion stoke. Exhaust gases are then released by opening the exhaust valve during the exhaust stroke (424a, 424b). Herein, as with Cylinder 1, since Cylinder 4 is to be kept active following the first cylinder event, the exhaust valve operation at 424a continues as expected. Likewise, since Cylinder 4 is to be kept active following the second cylinder event, the exhaust valve operation at 424b continues as expected, and is followed by another intake valve and fuel event at 421c and 422c, respectively.

With reference to the third cylinder, a first cylinder event is shown at 411b-413b and on the subsequent cylinder event (that is, during Cycle_2), Cylinder 3 is deactivated. Specifically, each of fuel, spark, and valve operation of Cylinder 3 is disabled on the cylinder event following 411b-413b. During the first cylinder event (that is, during Cycle_1), the intake valve is opened during the intake stroke (411b) to provide air to the cylinder. Fuel is then injected to the engine cylinders by port or direct injectors (412b). The fuel and air mixture are compressed and ignited (413b) during the compression stroke. Peak cylinder pressure may occur at top-dead-center of compression stroke or during the expansion stoke. However, since Cylinder 3 is to be deactivated following the first cylinder event, exhaust gases are not released, but instead are held in the cylinder by holding the exhaust valve closed during the exhaust stroke. In contrast, on the cylinder event preceding the first cylinder event shown at 411b-413b, the exhaust valve operation at 414a is allowed to continue with the exhaust valve opening on the exhaust stroke to release exhaust gases. By closing the exhaust valve on the cylinder event in Cylinder 3 (on Cycle_1) immediately preceding deactivation of Cylinder 3 (on Cycle_2), heat is retained in the combustion chamber, allowing for heating of the cylinder combustion surface, and thereby reducing the release of PM emissions when Cylinder 3 is subsequently reactivated. In addition, coolant temperature may be increased (e.g, slowly) for the rest of the engine, improving passenger comfort.

Likewise, with reference to the second cylinder, a first cylinder event is shown at 431b-433b and on the subsequent cylinder event, Cylinder 2 is deactivated. Specifically, each of fuel, spark, and valve operation of Cylinder 2 is disabled on the cylinder event following 431b-433b. During the first cylinder event, the intake valve is opened during the intake stroke (431b) to provide air to the cylinder. Fuel is then injected to the engine cylinders by port or direct injectors (432b). The fuel and air mixture are compressed and ignited (433b) during the compression stroke. Peak cylinder pressure may occur at top-dead-center of compression stroke or during the expansion stoke. However, since Cylinder 2 is to be deactivated following the first cylinder event, exhaust gases are not released, but instead are held in the cylinder by holding the exhaust valve closed during the exhaust stroke. In contrast, on the cylinder event preceding the first cylinder event shown at 431b-433b, the exhaust valve operation at 434a is allowed to continue with the exhaust valve opening on the exhaust stroke to release exhaust gases. By closing the exhaust valve on the cylinder event in Cylinder 2 immediately preceding deactivation of Cylinder 2, heat is retained in the combustion chamber, allowing for heating of the cylinder combustion surface, and thereby reducing the release of PM emissions when Cylinder 2 is subsequently reactivated.

It will be appreciated that when Cylinders 2 and 3 are subsequently reactivated, the exhaust valve of the reactivated cylinder may be opened before the intake valve(s) is opened to allow any residual gases remaining trapped in the cylinder to be pushed out before inducting a fresh charge into the cylinder. This allows misfire occurrences during the reactivation to be reduced. For example, in response to an indication for cylinder reactivation, the exhaust valve of the deactivated cylinder may be opened on an exhaust stroke of an engine cycle immediately preceding the reactivation so as expel the residuals. Then, the cylinder may be reactivated and the intake and exhaust valve may be operated in the intake and exhaust stroke, respectively, as intended. In other words, the exhaust valve of the deactivated cylinder is opened during an exhaust stroke immediately preceding the reactivation, and then during an exhaust stroke upon reactivation.

One example method for an engine comprises: selecting a cylinder for deactivation; and on an engine cycle immediately preceding the deactivation, maintaining an exhaust valve of the selected cylinder closed during an exhaust stroke of the cylinder. In the preceding example, the selecting a cylinder for deactivation is additionally or optionally responsive to a drop in engine load. In any or all of the preceding examples, during the selecting, an exhaust temperature is additionally or optionally higher than a threshold temperature. Any or all of the preceding examples may additionally or optionally further comprise, during reactivation of the selected cylinder, opening the exhaust valve before opening the intake valve to release trapped exhaust gases before inducting air. In any or all of the preceding examples, opening the exhaust valve may additionally or optionally include opening the exhaust valve during an exhaust stroke of an engine cycle immediately preceding the reactivation. In any or all of the preceding examples, the selected cylinder is a first cylinder, and the method may additionally or optionally further comprise selecting a second, different cylinder for deactivation, and operating the second cylinder with one or more of a deactivated intake valve, deactivated exhaust valve, a deactivated fuel injector, deactivated spark, and delayed spark. In any or all of the preceding examples, the operating may additionally or optionally include operating the second cylinder in a first mode with the intake valve opening during an intake stroke, the fuel injector deactivated, deactivated spark, and with the exhaust valve opening during an exhaust stroke; operating the second cylinder in a second mode with the intake valve opening during the intake stroke, the fuel injector activated, deactivated spark, and with the exhaust valve opening during the exhaust stroke; operating the second cylinder in a third mode with the intake valve opening during an intake stroke or a compression stroke, the fuel injector activated and fuel delivered during the compression stroke, spark deactivated, and with the exhaust valve opening during the exhaust stroke; operating the second cylinder in a fourth mode with the intake valve opening during the intake stroke, the fuel injector activated, spark delayed to the exhaust stroke, and with the exhaust valve opening during the exhaust stroke; and selecting a mode based on exhaust catalyst temperature. Any or all of the preceding examples may additionally or optionally further comprise deactivating the selected cylinder for a number of engine cycles, wherein the maintaining an exhaust valve of the selected cylinder closed is responsive to the number of engine cycles being higher than a threshold number. In any or all of the preceding examples, the threshold number is additionally or optionally based on one or more of an engine coolant temperature, an ambient temperature, and a cylinder temperature, the threshold number decreased as any of the engine coolant temperature, the ambient temperature, and the cylinder temperature decreases.

Another example method for an engine comprises: deactivating a cylinder pattern of individual cylinder mechanisms, the cylinder pattern including a first deactivated cylinder and a second active cylinder, wherein in response to a command for deactivation of the first cylinder, and further based on an engine temperature, an exhaust valve of the first cylinder is held closed on an exhaust stroke of an engine cycle immediately preceding the deactivation of the first cylinder. In the preceding example, the exhaust valve of the first cylinder may be additionally or optionally held closed in response to the engine temperature being lower than a threshold. In any or all of the preceding example, the cylinder pattern may additionally or optionally further include a number of engine cycles over which the first cylinder is maintained deactivated, and the method may additionally or optionally further comprise reactivating the first cylinder after the number of engine cycles. In any or all of the preceding examples, the engine temperature is additionally or optionally an estimated engine temperature or an expected engine temperature, the expected engine temperature including a temperature of the engine or an engine component expected at the reactivating. Any or all of the preceding examples may additionally or optionally further comprise, during the reactivating, opening the exhaust valve of the first cylinder before opening the intake valve of the first cylinder to release trapped exhaust gases before inducting air into the first cylinder. Any or all of the preceding examples may additionally or optionally further comprise, in response to the expected engine temperature being below a threshold, operating a third cylinder with a rich fuel injection delivered during a compression stroke and spark deactivated while operating a fourth cylinder with a lean fuel injection delivered during an intake stroke and spark deactivated.

Another example engine system comprises: an engine having a plurality of cylinders, each cylinder including an intake and an exhaust valve; a deactivation mechanism for deactivating at least one of the intake valve and exhaust valve of one of the plurality of cylinders; a temperature sensor for estimating an engine temperature; and a controller. The controller may be configured with computer-readable instructions stored on non-transitory memory for: selecting one of the plurality of cylinders for deactivation based on engine load; and on a first engine cycle, opening the intake valve of each of the plurality of engine cylinders during respective intake strokes, holding the exhaust valve of the one of the plurality of cylinders closed during an exhaust stroke while opening the exhaust valve of remaining cylinders during respective exhaust strokes; and on a second engine cycle, immediately following the first engine cycle, deactivating the intake valve and exhaust valve of the one of the plurality of cylinders while maintaining remaining cylinders active. In the preceding example, the holding of the exhaust valve of the one of the plurality of cylinders closed during the exhaust stroke may be additionally or optionally responsive to the engine temperature being lower than a threshold. Any or all of the preceding examples may additionally or optionally further comprise, operating one or more of the remaining cylinders with spark timing delayed into an exhaust stroke to raise the engine temperature above the threshold. Any or all of the preceding examples may additionally or optionally further comprise, operating at least one of the remaining cylinders with spark active and fuel enrichment while operating at least another of the remaining cylinders with spark active and fuel enleanment to raise the engine temperature above the threshold. Any or all of the preceding examples may additionally or optionally further comprise, on a third engine cycle, reactivating the exhaust valve of the one of the plurality of cylinders and opening the exhaust valve during an exhaust stroke, and during a fourth engine cycle immediately following the third engine cycle, reactivating the intake valve of the one of the plurality of cylinders and opening the intake valve during an intake stroke.

In a further representation, a method for an engine comprises deactivating a cylinder pattern of individual cylinder mechanisms, the cylinder pattern including a first deactivated cylinder and a second active cylinder, wherein in response to a command for deactivation of the first cylinder, an exhaust valve of the first cylinder is held closed on an exhaust stroke of a firing cycle immediately preceding the deactivation of the first cylinder.

In this way, the technical effect of retaining exhaust gases from combustion in a deactivated cylinder is that deactivation benefits can be extended for a longer duration without degrading exhaust emissions. By holding the exhaust valve of a cylinder to be deactivated on the next cycle closed during an exhaust stroke, hot exhaust gases may be kept in the cylinder, raising the temperature of the deactivated cylinder's combustion surface even while the cylinder is deactivated. As such, this not only reduces the need for cool cylinder reactivation, thereby improving fuel economy, but also reduces the particulate matter emissions from the reactivated cylinders. By optionally also operating active cylinders with variable valve and spark operation while other cylinders of the cylinder pattern are deactivated, exhaust catalyst warming is expedited, and a duration of engine operation with cylinder deactivation is prolonged. This allows the fuel economy benefits of cylinder deactivation to be extended, improving engine performance and fuel economy.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   selecting a first cylinder for deactivation; and
   on an engine cycle immediately preceding the deactivation, maintaining an exhaust valve of the selected cylinder closed during an exhaust stroke of the cylinder;
   selecting a second, different cylinder for deactivation, and
   operating the second cylinder in a first mode with an intake valve opening during an intake stroke, a fuel injector deactivated, deactivated spark, and with an exhaust valve opening during an exhaust stroke;
   operating the second cylinder in a second mode with the intake valve opening during the intake stroke, the fuel injector activated, deactivated spark, and with the exhaust valve opening during the exhaust stroke;
   operating the second cylinder in a third mode with the intake valve opening during the intake stroke or a compression stroke, the fuel injector activated and fuel delivered during the compression stroke, deactivated spark, and with the exhaust valve opening during the exhaust stroke;
   operating the second cylinder in a fourth mode with the intake valve opening during the intake stroke, the fuel injector activated, spark delayed to the exhaust stroke, and with the exhaust valve opening during the exhaust stroke; and
   selecting one of the modes based on exhaust catalyst temperature.

2. The method of claim 1, wherein the selecting a cylinder for deactivation is responsive to a drop in engine load.

3. The method of claim 1, wherein, during the selecting, an exhaust temperature is higher than a threshold temperature.

4. The method of claim 1, further comprising, during reactivation of the selected first cylinder, opening the exhaust valve before opening an intake valve to release trapped exhaust gases before inducting air.

5. The method of claim 1, wherein opening the exhaust valve includes opening the exhaust valve during an exhaust stroke of an engine cycle immediately preceding the reactivation.

6. The method of claim 1, further comprising deactivating the selected first cylinder for a number of engine cycles, wherein the maintaining an exhaust valve of the selected first cylinder closed is responsive to the number of engine cycles being higher than a threshold number.

7. The method of claim 6, wherein the threshold number is based on one or more of an engine coolant temperature, an ambient temperature, and a cylinder temperature, the threshold number decreased as any of the engine coolant temperature, the ambient temperature, and the cylinder temperature decreases.

8. A method for an engine, comprising:
   deactivating a cylinder pattern of individual cylinder mechanisms, the cylinder pattern including a first deactivated cylinder and a second active cylinder, wherein in response to a command for deactivation of the first cylinder, and further based on an engine temperature, an exhaust valve of the first cylinder is held closed on an exhaust stroke of an engine cycle immediately preceding the deactivation of the first cylinder; and in response to the engine temperature being below a threshold, operating a third cylinder with a rich fuel injection delivered during a compression stroke and spark deactivated while operating a fourth cylinder with a lean fuel injection delivered during an intake stroke and spark deactivated.

9. The method of claim 8, wherein the exhaust valve of the first cylinder held closed based on engine temperature includes the exhaust valve held closed in response to the engine temperature being lower than the threshold.

10. The method of claim 9, wherein the cylinder pattern further includes a number of engine cycles over which the first cylinder is maintained deactivated, the method further comprising reactivating the first cylinder after the number of engine cycles.

11. The method of claim 10, wherein the engine temperature is an estimated engine temperature or an expected engine temperature, the expected engine temperature including a temperature of the engine or an engine component expected at the reactivating.

12. The method of claim 10, further comprising, during the reactivating, opening the exhaust valve of the first cylinder before opening an intake valve of the first cylinder to release trapped exhaust gases before inducting air into the first cylinder.

13. An engine system, comprising:
an engine having a plurality of cylinders, each cylinder including an intake valve and an exhaust valve;
a deactivation mechanism for deactivating at least one of the intake valve and the exhaust valve of one of the plurality of cylinders;
a temperature sensor for estimating an engine temperature; and
a controller configured with computer-readable instructions stored on non-transitory memory for:
selecting one of the plurality of cylinders for deactivation based on engine load; and
on a first engine cycle, opening the intake valve of each of the plurality of engine cylinders during respective intake strokes, holding the exhaust valve of the one of the plurality of cylinders closed during an exhaust stroke while opening the exhaust valve of remaining cylinders during respective exhaust strokes; and
on a second engine cycle, immediately following the first engine cycle, deactivating the intake valve and the exhaust valve of the one of the plurality of cylinders while maintaining remaining cylinders active;
wherein the holding the exhaust valve of the one of the plurality of cylinders closed during the exhaust stroke is responsive to the engine temperature being lower than a threshold, the method further comprising operating at least one of the remaining cylinders with spark active and fuel enrichment while operating at least another of the remaining cylinders with spark active and fuel enleanment to raise the engine temperature above the threshold.

14. The system of claim 13, further comprising operating one or more of the remaining cylinders with spark timing delayed into an exhaust stroke to raise the engine temperature above the threshold.

15. The system of claim 13, further comprising, on a third engine cycle, reactivating the exhaust valve of the one of the plurality of cylinders and opening the exhaust valve during an exhaust stroke, and during a fourth engine cycle immediately following the third engine cycle, reactivating the intake valve of the one of the plurality of cylinders and opening the intake valve during an intake stroke.

* * * * *